United States Patent
Gordon

(10) Patent No.: US 11,248,658 B2
(45) Date of Patent: Feb. 15, 2022

(54) DUAL PLUNGING CONSTANT VELOCITY DRIVE SHAFT

(71) Applicant: Robby Gordon, Charlotte, NC (US)

(72) Inventor: Robby Gordon, Charlotte, NC (US)

(*) Notice: Subject to any disclaimer, the term of this patent is extended or adjusted under 35 U.S.C. 154(b) by 129 days.

(21) Appl. No.: 16/714,505

(22) Filed: Dec. 13, 2019

(65) Prior Publication Data

US 2020/0116204 A1 Apr. 16, 2020

Related U.S. Application Data

(63) Continuation of application No. 15/442,428, filed on Feb. 24, 2017, now Pat. No. 10,539,192.

(60) Provisional application No. 62/300,489, filed on Feb. 26, 2016.

(51) Int. Cl.
*F16D 3/221* (2006.01)
*B60B 35/12* (2006.01)
*F16D 3/84* (2006.01)
*B60B 35/14* (2006.01)

(52) U.S. Cl.
CPC .......... *F16D 3/221* (2013.01); *B60B 35/128* (2013.01); *F16D 3/841* (2013.01); *B60B 35/14* (2013.01); *Y10S 464/906* (2013.01)

(58) Field of Classification Search
CPC ......... B60B 35/128; B60B 35/14; F16D 3/22; F16D 3/221; F16D 3/84; F16D 3/841; Y10S 464/906
USPC .......................................... 464/140–146, 906
See application file for complete search history.

(56) References Cited

U.S. PATENT DOCUMENTS

| | | | |
|---|---|---|---|
| 4,300,651 A | 11/1981 | Krude | |
| 4,669,571 A | 6/1987 | Kurde | |
| 4,772,246 A | 9/1988 | Wenzel | |
| 7,540,808 B2 | 6/2009 | Iwashita | |
| 7,867,098 B2 | 1/2011 | Jacob | |
| 8,029,375 B2 | 10/2011 | Takekawa | |
| 8,714,293 B2 | 5/2014 | Despres-Nadeau | |

(Continued)

FOREIGN PATENT DOCUMENTS

JP 53123744 10/1978

OTHER PUBLICATIONS

Translation of JP 53-123744, Takahashi, et al. Driving Device, Oct. 28, 1978.

(Continued)

*Primary Examiner* — Josh Skroupa
(74) *Attorney, Agent, or Firm* — Rutan & Tucker LLP; Hani Z. Sayed

(57) ABSTRACT

A dual plunging constant velocity (CV) drive shaft is provided for communicating rotational forces from a transaxle to a drive wheel of a vehicle. The dual plunging CV drive shaft comprises a drive shaft that transfers torque from the transaxle to the drive wheel. An inboard plunging CV joint is coupled between the transaxle and the drive shaft, and an outboard plunging CV joint is coupled between the drive shaft and the drive wheel. The inboard and outboard plunging CV joints each comprises an elongate housing that receives a CV joint coupled with the drive shaft. The inboard and outboard plunging CV joints communicate rotational forces from the transaxle to the drive wheel during vertical pivoting of a trailing arm coupled with the outboard plunging CV joint. The elongate housings allow the drive shaft to "float" longitudinally, as needed, during extreme pivoting motion of the suspension.

8 Claims, 5 Drawing Sheets

(56) References Cited

U.S. PATENT DOCUMENTS

2015/0014059 A1 1/2015 Perry
2016/0333940 A1 11/2016 Wingerter

OTHER PUBLICATIONS

For New Technology Network NTN, Constant Velocity Joints for Automobiles, Cat. No. 5601-IV/JE.

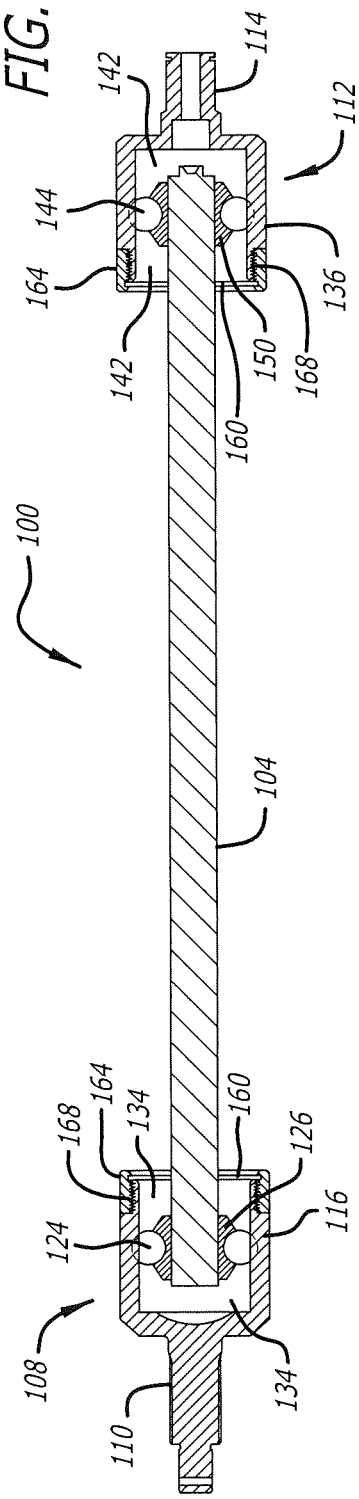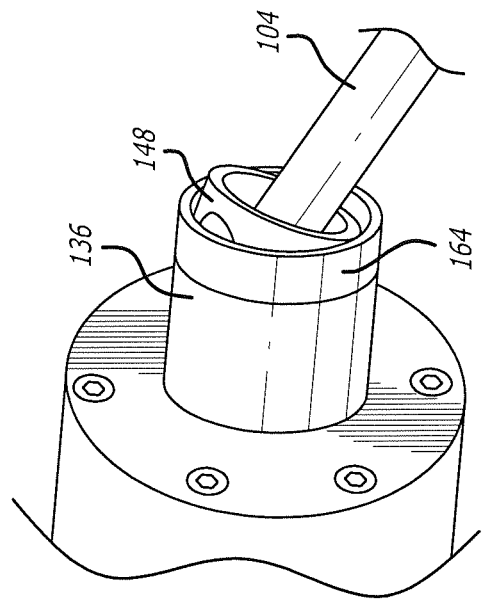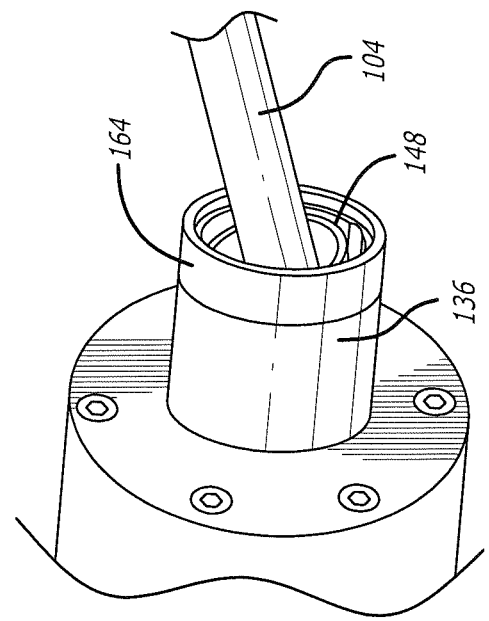

DUAL PLUNGING CONSTANT VELOCITY DRIVE SHAFT

PRIORITY

This continuation application claims the benefit of and priority to U.S. patent application Ser. No. 15/442,428 filed on Feb. 24, 2017 and U.S. Provisional Application, entitled "Dual Plunging Constant Velocity Drive Shaft," filed on Feb. 26, 2016 and having application Ser. No. 62/300,489.

FIELD

The field of the present disclosure generally relates to vehicle drivetrains. More particularly, the field of the invention relates to a dual plunging constant velocity drive shaft for off-road vehicle drivetrains.

BACKGROUND

Trailing arm suspensions are well known and commonly used in heavy-duty vehicles, such as semi tractor-trailer configurations, as well as off-road vehicles such as four-wheeled buggies. A typical trailing arm suspension comprises a trailing arm having one end pivotally connected to a vehicle frame through a frame bracket and another end connected to the vehicle frame by a spring or strut. The trailing arm generally supports an axle to which the vehicle wheels are mounted. Road-induced reaction forces acting on the wheels are controlled by the pivoting of the trailing arm in response to these forces, with the forces being resisted by the spring.

Constant velocity (CV) joints allow pivoting of the trailing arm while a drive shaft coupled to the CV joint delivers power to the wheels at constant rotational speeds. Although CV joints are typically used in front wheel drive vehicles, off-road vehicles such as four-wheeled buggies comprise CV joints at all wheels. Constant velocity joints typically are protected by a rubber boot and filled with molybdenum disulfide grease.

Given that off-road vehicles routinely travel over very rough terrain, such as mountainous regions, there is a desire to improve the mechanical strength and performance of off-road drivetrain and suspension systems, while at the same reducing the mechanical complexity of such systems.

SUMMARY

A dual plunging constant velocity (CV) drive shaft is provided for conducting rotational motion from a transaxle to a drive wheel of a vehicle. The dual plunging CV drive shaft comprises an inboard elongate housing that is coupled with the transaxle and an outboard elongate housing that is coupled with the drive wheel. A trailing awl may support the drive wheel by way of one or more bearings. A drive shaft is coupled at a first end with a first CV joint that is operably disposed within the inboard elongate housing. A second end of the drive shaft is coupled with a second CV joint that is operably disposed within the outboard elongate housing. Longitudinal ball races, or other CV configurations, are disposed within the inboard and outboard elongate housings and configured to allow the first and second CV joints to move longitudinally relative to the transaxle and the trailing arm. Longitudinal movement of the first and second CV joints enables the drive shaft to "float" between the transaxle and the trailing arm during pivoting motion of the trailing arm.

In an exemplary embodiment, a dual plunging CV drive shaft for conducting rotational motion from a transaxle to a drive wheel of a vehicle, is disclosed, comprising: a drive shaft comprising an elongate member configured to transfer torque from the transaxle to the drive wheel; an inboard plunging CV joint between the transaxle and the drive shaft; and an outboard plunging CV joint between the drive shaft and the drive wheel.

In another exemplary embodiment, the outboard plunging CV joint comprises an axle configured to be coupled with the drive wheel, and wherein the inboard plunging CV joint comprises a splined shaft configured to be coupled with the transaxle. In another exemplary embodiment, the outboard plunging CV joint comprises an elongate housing that receives a CV joint coupled with the drive shaft, the CV joint being comprised of a plurality of balls positioned uniformly around an inner race and retained thereon by way of a bearing cage, the inner race comprising recesses configured to allow the plurality of balls to move longitudinally relative to the drive shaft. In one embodiment, a longitudinal ball race may be disposed within an interior of the elongate housing and extending along the length of the interior allows the plurality of balls to move longitudinally relative to the elongate housing. In another exemplary embodiment, the longitudinal ball race and the recesses work in concert to allow the balls to move longitudinally therebetween so as to accommodate various angles between the drive shaft and the axle.

In another exemplary embodiment, the inboard plunging CV joint is comprised of an elongate housing that includes a splined shaft configured to be coupled with the transaxle. In another exemplary embodiment, the elongate housing comprises a longitudinal ball race within an interior and extending along the length of the interior, the longitudinal ball race being configured to allow for longitudinal movement of a plurality of balls comprising the inboard plunging CV joint relative to the elongate housing. In one embodiment, the plurality of balls is distributed uniformly around an inner race that is engaged with the drive shaft, a bearing cage being configured to retain the balls within recesses in the inner race that allows the plurality of balls to move longitudinally relative to the drive shaft. In another exemplary embodiment, the longitudinal ball race and the recesses of the inner race cooperate to allow the plurality of balls to move longitudinally between the elongate housing and the inner race, thereby accommodating various angles between the drive shaft and the splined shaft.

In another exemplary embodiment, the inboard and outboard plunging CV joints are configured to communicate rotational forces from the transaxle to the drive wheel during vertical pivoting of a trailing arm coupled with the outboard plunging CV joint. In another exemplary embodiment, the inboard plunging CV joint and the outboard plunging CV joint are configured to allow longitudinal movement of the drive shaft relative to the transaxle and the trailing arm, the longitudinal movement enabling the drive shaft to "float" between the transaxle and trailing arm during extreme pivoting motion of the trailing arm. In another exemplary embodiment, the inboard plunging CV joint and the outboard plunging CV joint are configured to ensure that uninterrupted rotational power is conducted to the drive wheels at substantially all angles and substantially all longitudinal positions of the drive shaft relative to the transaxle and the trailing arm.

In an exemplary embodiment, a dual plunging constant velocity (CV) drive shaft for conducting rotational motion from a transaxle to a drive wheel of a vehicle comprises an inboard elongate housing that is coupled with the transaxle; an outboard elongate housing that is coupled with the drive wheel, a trailing arm supporting the drive wheel by way of one or more bearings; and a drive shaft coupled at a first end with a first CV joint operably disposed within the inboard elongate housing, and coupled at a second end with a second CV joint that is operably disposed within the outboard elongate housing.

In another exemplary embodiment, a longitudinal ball race disposed within an interior of the inboard elongate housing is configured to allow the first CV joint to move longitudinally relative to the transaxle, and wherein a longitudinal ball race disposed within an interior of the outboard elongate housing is configured to allow the second CV joint to move longitudinally relative to the trailing arm. In another exemplary embodiment, the first CV joint is comprised of a plurality of balls positioned uniformly around an inner race and retained thereon by way of a bearing cage, the inner race comprising recesses configured to allow the plurality of balls to move longitudinally relative to the drive shaft, and wherein the second first CV joint is comprised of a plurality of balls positioned uniformly around an inner race comprising recesses configured to allow the plurality of balls to move longitudinally relative to the trailing arm, the plurality of balls being retained on the inner race by way of a bearing cage.

In another exemplary embodiment, the inboard elongate housing and the outboard elongate housing each comprises a groove that receives a snap-ring, the grooves and the snap-rings cooperating to retain the first CV joint and the second CV joint respectively retained with the inboard elongate housing and the outboard elongate housing. In another exemplary embodiment, the groove is circumferentially disposed at an outer-most edge of the interior of each of the inboard elongate housing and the outboard elongate housing. In another exemplary embodiment, each of the inboard elongate housing and the outboard elongate housing comprises threads that are configured to rotatably engage with threads disposed within an interior of an end-cap, a groove being comprised of clearance remaining between an interior surface of the end-cap and the edge of each of the inboard elongate housing and the outboard elongate housing. In another exemplary embodiment, each groove is configured to receive a snap-ring, the grooves and snap-rings being configured to cooperatively retain the first CV joint and the second CV joint respectively retained with the inboard elongate housing and the outboard elongate housing. In another exemplary embodiment, each of the inboard elongate housing and the outboard elongate housing comprises threads that are configured to rotatably engage with threads disposed within an interior of an end-cap, a lip of the end-cap comprising a narrow portion of the end-cap that prevents the first CV joint and the second CV joint from exiting respective interiors of the inboard elongate housing and the outboard elongate housing.

BRIEF DESCRIPTION OF THE DRAWINGS

The drawings refer to embodiments of the present disclosure in which:

FIG. 6 illustrates a cross-sectional view of an exemplary embodiment of a dual plunging CV drive shaft according to the present disclosure;

FIG. 7A illustrates an exemplary use environment showing an inboard plunging CV joint during maximal loading of a suspension of a vehicle, according to the present disclosure;

FIG. 7B illustrates an exemplary use environment showing an inboard plunging CV joint during unloading of a suspension of a vehicle in accordance with the present disclosure;

Figure 1:
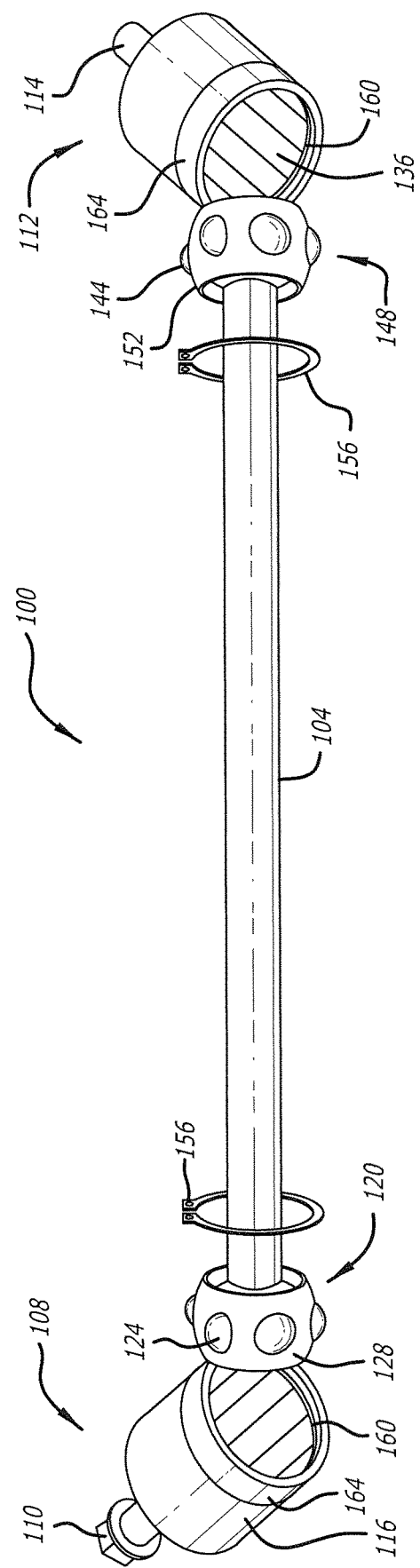
FIG. 1 illustrates a perspective view of an exemplary embodiment of a dual plunging CV drive shaft, according to the present disclosure.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first joint," may be made. However, the specific numeric reference should not be interpreted as a literal sequential order but rather interpreted that the "first joint" is different than a "second joint." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, the present disclosure describes a dual plunging constant velocity (CV) drive shaft for conducting rotational motion from a transaxle to a drive wheel of a vehicle. The dual plunging CV drive shaft comprises a drive shaft that is configured to transfer torque from the transaxle to the drive wheel. An inboard plunging CV joint is coupled between the transaxle and the drive shaft, and an outboard plunging CV joint is coupled between the drive shaft and the drive wheel. Each of the inboard and outboard plunging CV joints comprises an elongate housing that receives a CV joint coupled with the drive shaft. The elongate housings include longitudinal ball races configured to allow the CV joints to move longitudinally relative to the elongate housings. The inboard and outboard plunging CV joints are configured to communicate rotational forces from the transaxle to the drive wheel during vertical pivoting of a trailing arm coupled with the outboard plunging CV joint, as well as allowing longitudinal movement of the drive shaft relative to the elongate housings. The longitudinal movement enables the drive shaft to "float" between the transaxle and drive wheel during extreme pivoting of the trailing arm. Configuring the drive shaft to float substantially eliminates binding of the drive shaft and CV joints, as well as eliminating undesirable tire scrub.

FIG. 1 illustrates a perspective view of an exemplary embodiment of a dual plunging CV drive shaft 100, according to the present disclosure. The dual plunging CV drive shaft 100 is a generally elongate assembly comprising a drive shaft 104 coupled with an outboard plunging CV joint 108 at one end and coupled with an inboard plunging CV joint 112 at an opposed end. The dual plunging CV drive shaft 100 is configured to conduct torque from a transaxle to a drive wheel of a vehicle, such as off-road or four-wheel vehicles, and accommodate the vertical pivoting motion of the suspension in response to road conditions. As such, the outboard plunging CV joint 108 comprises an axle 110 that is configured to be coupled with the drive wheel. The inboard plunging CV joint 112 comprises a splined shaft 114 that is configured to be coupled with the transaxle.

Figure 2:
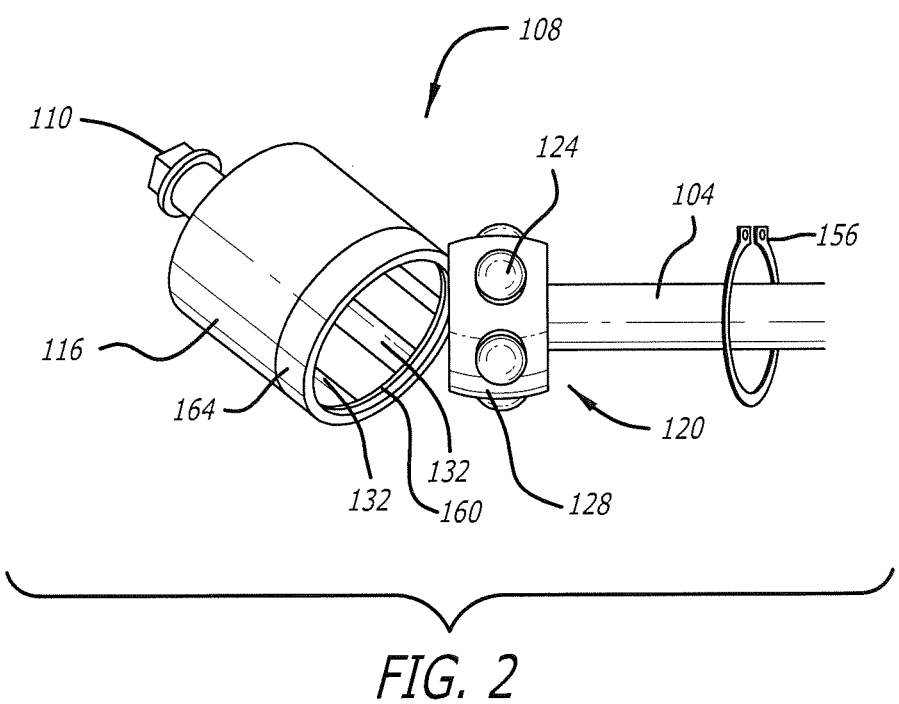
FIG. 2 is a close-up perspective view of an outboard plunging CV joint of the dual plunging CV drive shaft shown in FIG. 1, in accordance with the present disclosure.
Figure 3:
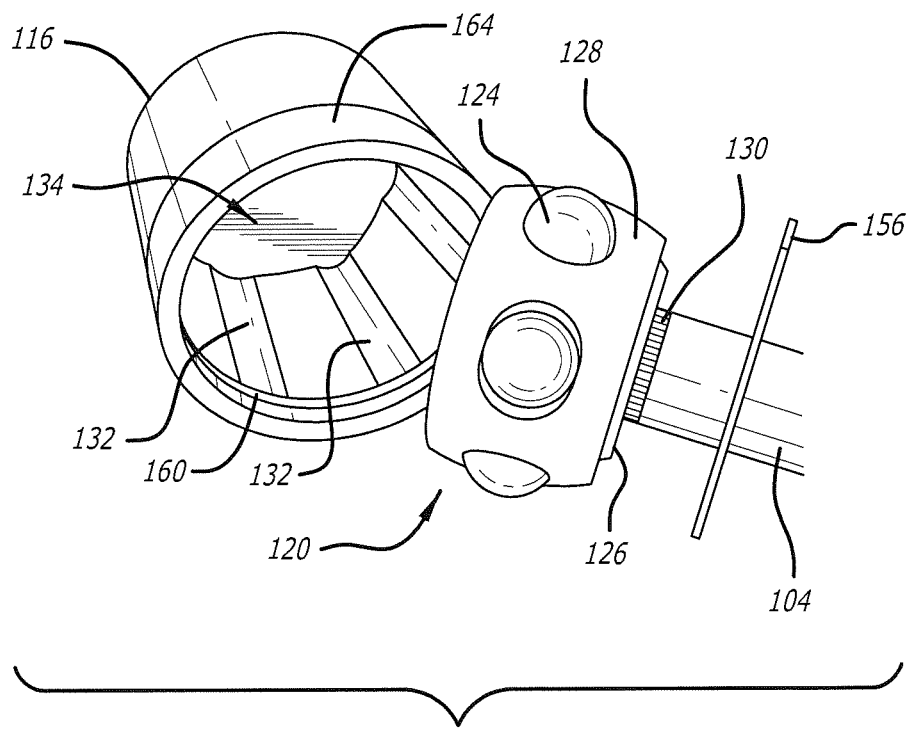
FIG. 3 illustrates a perspective view of the outboard plunging CV joint shown in FIG. 2, according to the present disclosure.

As best shown in FIGS. 2-3, the outboard plunging CV joint 108 comprises an elongate housing 116 that receives a CV joint 120 coupled with the drive shaft 104. The CV joint 120 is comprised of a plurality of balls 124 positioned uniformly around an inner race 126, as best shown in FIG. 3. The balls 124 are retained in position, at least in part, by way of a bearing cage 128. Preferably, splines 130 on the end of the drive shaft 104 engage with similar splines within the inner race 126 so as to fixedly couple the inner race onto the drive shaft. A snap-ring may be attached to the end of the drive shaft 104 to retain the inner race 126 fixedly mounted onto the drive shaft. In some embodiments, however, the snap-ring may be omitted, thus allowing the splines 130 to advantageously slip, as desired.

A longitudinal ball race 132 disposed within an interior 134 of the elongate housing 116 allows the balls 124 to move longitudinally relative to the elongate housing. As shown in FIG. 3, the longitudinal ball race 132 extends along the length of the interior 134 of the elongate housing 116. Recesses in the inner race 126 allow the balls 124 to move longitudinally relative to the drive shaft 104. As will be appreciated, therefore, the longitudinal ball race 132 and the recesses of the inner race 126 work in concert, allowing the balls 124 to move longitudinally therebetween, thus accommodating various angles between the drive shaft 104 and the axle 110.

Figure 4:
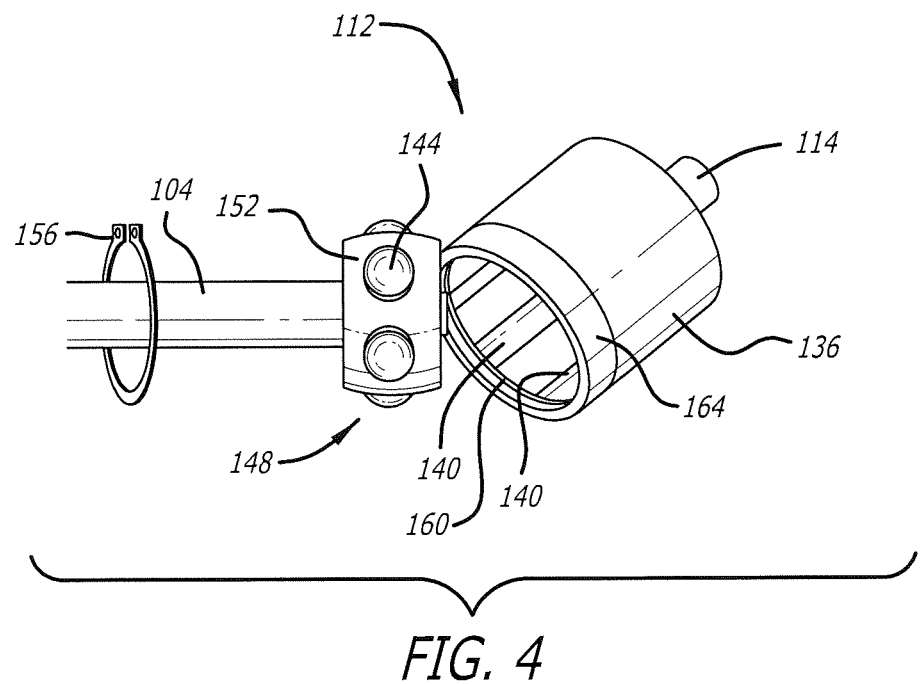
FIG. 4 illustrates a close-up perspective view of an inboard plunging CV joint of the dual plunging CV drive shaft shown in FIG. 1, according the present disclosure.
Figure 5:
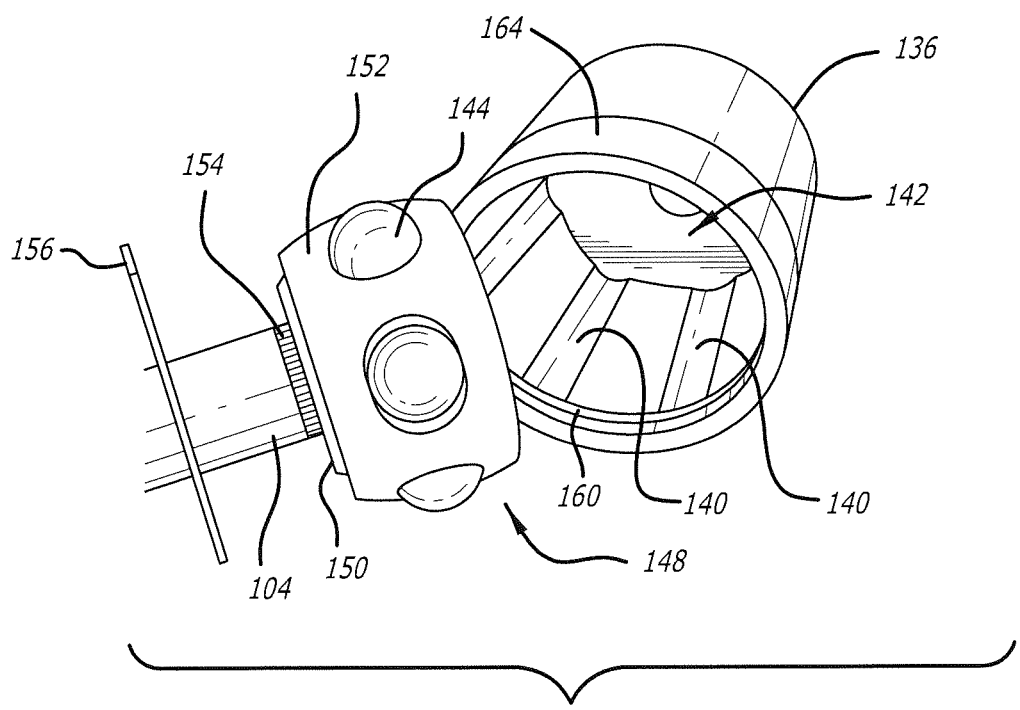
FIG. 5 illustrates a perspective view of the inboard plunging CV joint shown in FIG. 4, in accordance with the present disclosure.

FIGS. 4-5 illustrate a close-up perspective view of the inboard plunging CV joint 112. As shown in FIG. 4, the inboard plunging CV joint 112 may be comprised of an elongate housing 136 that includes the above-mentioned splined shaft 114 configured to be received into the transaxle. The elongate housing 136 includes a longitudinal ball race 140 within an interior 142 that is configured to receive a plurality of balls 144 comprising a CV joint 148. As best shown in FIG. 5, the longitudinal ball race 140 extends along the length of the interior 142 of the elongate housing 136. The longitudinal ball race 140 allows the balls 144 to move longitudinally relative to the elongate housing 136. As best shown in FIG. 5, the balls 144 comprising the CV joint 148 may be positioned uniformly around an inner race 150 that is engaged with the drive shaft 104. Splines within the inner race 150 preferably engage with similar splines 154 on the end of the drive shaft 104 to couple the inner race 150 with the drive shaft. A snap-ring may be attached to the end of the drive shaft 104 to retain the inner race 150 mounted onto the drive shaft, or in some embodiments the splines 154 may be allowed to advantageously slip in absence of the snap-ring. A bearing cage 152 retains the balls 144 within recesses in the inner race 150 that allow the balls to move longitudinally relative to the drive shaft 104. Thus, the longitudinal ball race 140 and the recesses of the inner race 150 cooperate to allow the balls 144 to move longitudinally between the elongate housing 136 and the inner race, thereby accommodating various angles between the drive shaft 104 and the splined shaft 114.

Those skilled in the art will recognize that, similarly to conventional CV joints, the plunging CV joints 108, 112 are configured to communicate rotational forces from the transaxle to the drive wheel while a trailing arm supporting the drive wheel pivots vertically due to road conditions. Unlike conventional CV joints, however, the plunging CV joints 108, 112 are configured to allow longitudinal movement of the drive shaft 104 relative to the elongate housings 116 and 136. As shown in FIG. 6, the interior 134 of the elongate housing 116 comprises an unobstructed volume on both sides of the balls 124, thereby allowing the drive shaft 104 to be moved longitudinally within the interior 134 of the elongate housing 116. Similarly, the interior 142 of the elongate housing 136 includes an unobstructed volume on both sides of the balls 144. Thus, the interior 142 facilitates longitudinal motion of the drive shaft 104 within the interior 142 of the elongate housing 136. It should be understood, therefore, that when the elongate housing 116 is coupled to a drive wheel of the vehicle, and the elongate housing 136 is coupled to the transaxle, the unobstructed volume within the elongate housings 116, 136 allows for longitudinal movement of the drive shaft 104 between the transaxle and the drive wheel.

It is contemplated that the longitudinal movement of the drive shaft 104 enables the drive shaft to "float" as needed during extreme pivoting motion of the trailing arm. For example, when the suspension of the vehicle is loaded to maximum bump, as shown in FIG. 7A, the drive shaft 104 may travel relatively deeply into the interiors 134, 142 of the elongate housings 116, 136. Yet, when the suspension is unloaded, as shown in FIG. 7B, the drive shaft 104 may migrate to a relatively shallow region within the elongate housings 116, 136. Further, the operation of the CV joints 120, 148 ensures that uninterrupted rotational power is conducted to the drive wheel at substantially all angles between the drive shaft 104 and the elongate housings 116, 136, as well as at substantially all longitudinal positions of the drive shaft relative to the elongate housings 116, 136. It should be recognized that allowing the drive shaft 104 to float within the elongate housings 116, 136, as disclosed herein, advantageously eliminates occurrences of binding within the suspension and drivetrain of the vehicle during extreme pivoting movements of the trailing arm. Furthermore, the floating drive shaft 104 may substantially eliminate instances of tire scrub that is frequently encountered with conventional drivetrains.

In some embodiments, either or both of the plunging CV joints 108, 112 may be comprised of a plunging tripod CV joint. As such, either of the elongate housings 116, 136 may be a generally tulip-shaped member comprising three angularly spaced slots that receive three angularly spaced rollers supported by trunnions projecting radially from the drive shaft 104. As will be appreciated, each roller of the tripod is tubular and includes an inner bearing surface and an outer bearing surface. The inner bearing surface is generally cylindrical and bears against needles, whereas the outer bearing surface is spherically shaped and rides against tracks defined by opposing sides of the spaced slots of the tulip member. Moreover, the plunging CV joints 108, 112 may be comprised of either a double offset CV joint or a plunging disk type cross groove CV joint comprising ball races that have skewed grooves or non-linear grooves, such as a curved groove or a compositely shaped groove, or a combination of linear grooves and non-linear grooves. Further, in some embodiments, either or both of the plunging CV joints 108, 112 may be counter-track CV joints having identically orientated opposed pairs of grooves. It should be understood, therefore, that the plunging CV joints 108, 112 described herein are not to be limited to utilizing balls 144, but rather various other types of joints that without the balls may be incorporated into the dual plunging CV drive shaft 100, without limitation.

It is contemplated that the CV joints 120, 148 may be retained within their respective elongate housings 116, 136 by way of any mechanical means deemed suitable without restricting or interfering with the longitudinal movement of the drive shaft 104 described herein. In the illustrated embodiment of FIGS. 1-6, the elongate housings 116, 136 each comprises a groove 160 that is configured to receive a snap-ring. The grooves 160 are circumferentially disposed at an outer-most edge of the respective interiors 134, 142 of the elongate housings 116, 136. The grooves 160 and snap-rings cooperate to prevent the CV joints 120, 148 from exiting the elongate housings 116, 136 during operation of the drive shaft 104, or during extreme pivoting movements of the trailing arm.

The grooves 160 may be machined directly into the elongate housings 116, 136 or may be formed by way of clearance disposed between multiple components that comprise the elongate housings. For example, in the embodiment illustrated in FIGS. 1-6, the elongate housings 116, 136 may each be comprised of an end-cap 164 that may be threadably engaged with each of the elongate housings. As best shown in FIG. 6, an interior of the end-cap 164 may be comprised of threads that are configured to rotatably engage with threads 168 disposed on an exterior of each of the elongate housings 116, 136. Once the end-cap 164 is maximally engaged with the elongate housing, the groove 160 may be comprised of clearance remaining between an interior surface of the end-cap 164 and the edge of the elongate housing.

Figure 8:
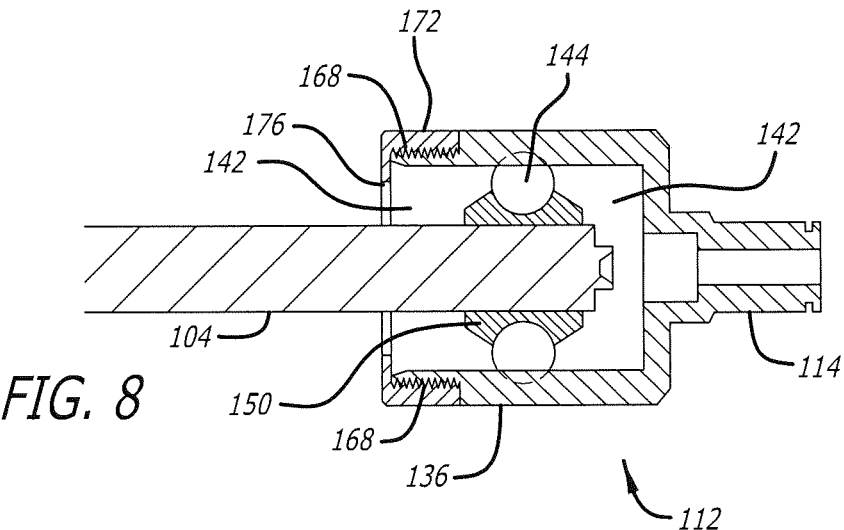
FIG. 8 illustrates a cross-sectional view of an inboard plunging CV joint of a dual plunging CV drive shaft, according the present disclosure.
Figure 9:
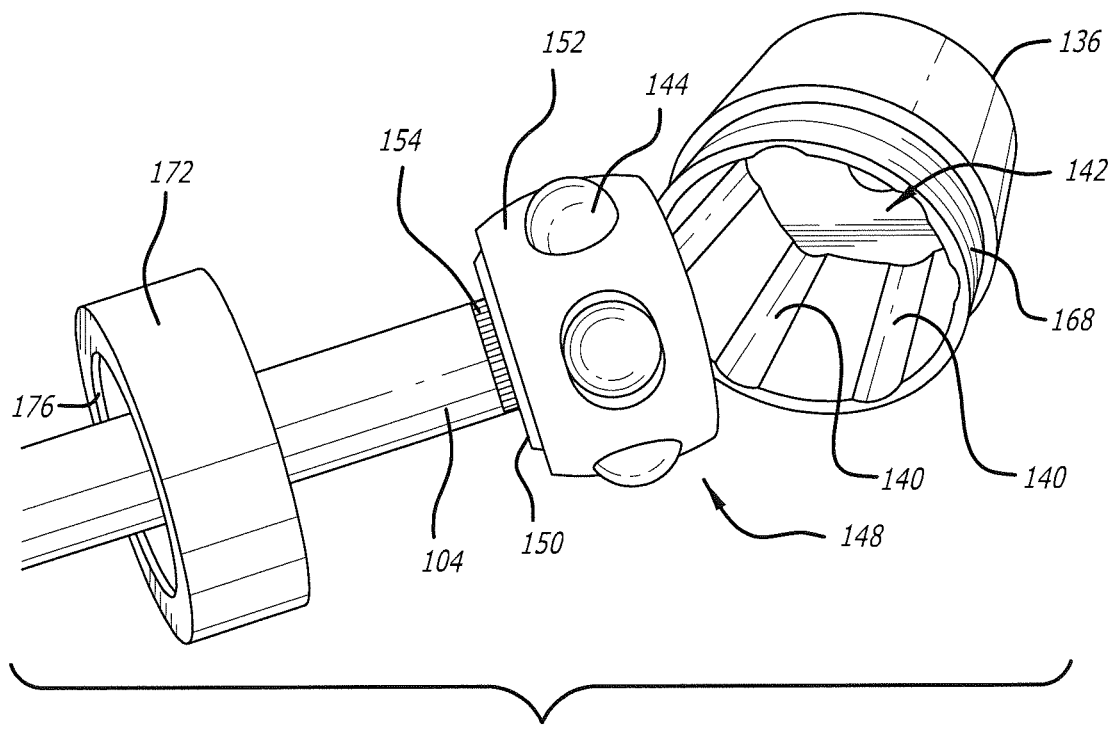
FIG. 9 illustrates a perspective view of the inboard plunging CV joint shown in FIG. 8, in accordance with the present disclosure.

In one embodiment illustrated in FIGS. 8-9, each of the elongate housings 116, 136 is comprised of an end-cap 172 that is configured to retain the CV joints 120, 148 within the interiors 134, 142, as described above. The end-cap 172 is substantially similar to the end-cap 164, with the exception that the end-cap 172 comprises a lip 176, in lieu of the groove 160. The lip 176 comprises a narrow portion of the end-cap 172 that prevents the CV joints 120, 148 from exiting the interiors 134, 142. Similar to the end-cap 164, an interior of the end-cap 172 may be comprised of threads that are configured to rotatably engage with the threads 168 disposed on an exterior of each elongate housing 116, 136. Once the end-cap 172 is maximally engaged with the elongate housing, the lip 176 is positioned to retain the CV joints 120, 148 within the elongate housings 116, 136. It should be understood that the elongate housings 116, 136 are not limited to being coupled with the end-caps 164, 172, but rather any of various mechanical means may be implemented to retain the CV joints 120, 148 within the elongate housings 116, 136, without limitation.

It is contemplated that the overall length of the dual plunging CV drive shaft 100 generally depends on the distance between the transaxle and the drive wheel, and thus is dependent on the type of vehicle in which the dual plunging CV drive shaft 100 is intended to be used. In addition, the degree to which the drive shaft 104 may undergo longitudinal movement, or "float," during operation of the dual plunging CV drive shaft 100 generally depends, in part, on the angle through which the trailing arm may pivot, as well as the overall length of the drive shaft 104. In one embodiment, the drive shaft 104 has an overall length of substantially 24.265 inches, as shown in FIG. 6; however, in other embodiments, the overall length of the drive shaft 104 may range between substantially 17 inches and 35 inches. In should be understood, therefore, that the specific dimensions of the various components comprising the dual plunging CV drive shaft 100 may be varied, without limitation, as needed to incorporate the dual plunging CV drive shaft 100 into a wide variety of different vehicles, without deviating beyond the spirit and scope of the present disclosure.

Moreover, it should be understood that the specific configuration incorporated into the axle 110, the splined shaft 114, as well as the number and size of the splines disposed at the ends of the drive shaft 104 and within the inner races 126, 150, generally may be varied, without limitation, depending on the particular vehicle with which the dual plunging CV drive shaft 100 is intended to be used. Therefore, it should be recognized that the dual plunging CV drive shaft 100 is not to be limited to the specific configuration shown in the figures. Rather, any of the various components disclosed herein may be varied, without limitation, as needed to incorporate the dual plunging CV drive shaft 100 into a wide variety of different vehicles, without deviating beyond the spirit and scope of the present disclosure.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A dual plunging constant velocity, CV, drive shaft for conducting rotational motion from a transaxle to a drive wheel of a vehicle, comprising:
    an inboard elongate housing that is configured to be coupled with the transaxle;
    an outboard elongate housing that is configured to be coupled with the drive wheel, and a trailing arm supporting the drive wheel by way of one or more bearings, wherein each of the inboard elongate housing and the outboard elongate housing comprises threads that are configured to rotatably engage with threads disposed within an interior of an end-cap, a groove being comprised of clearance remaining between an interior surface of the end-cap and the edge of each of the inboard elongate housing and the outboard elongate housing; and an elongate member coupled at a first end with a first CV joint that is configured to move longitudinally within the inboard elongate housing, and coupled at a second end with a second CV joint that is configured to move longitudinally within the outboard elongate housing, wherein the inboard elongate housing is configured to enable at least a portion of the first CV joint to be exposed to an exterior of the inboard elongate housing during longitudinal movement.

2. The drive shaft of claim 1, wherein a longitudinal ball race disposed within an interior of the inboard elongate housing is configured to allow the first CV joint to move longitudinally relative to the transaxle, and wherein a longitudinal ball race disposed within an interior of the outboard elongate housing is configured to allow the second CV joint to move longitudinally relative to the trailing arm.

3. The drive shaft of claim 1, wherein the first CV joint is comprised of a plurality of balls positioned uniformly around an inner race and retained thereon by way of a bearing cage, the inner race comprising recesses configured to allow the plurality of balls to move longitudinally relative to the drive shaft, and wherein the second first CV joint is comprised of a plurality of balls positioned uniformly around an inner race comprising recesses configured to allow the plurality of balls to move longitudinally relative to the trailing arm, the plurality of balls being retained on the inner race by way of a bearing cage.

4. The drive shaft of claim 1, wherein the inboard elongate housing and the outboard elongate housing each comprises a groove that receives a snap-ring, the grooves and the snap-rings cooperating to retain the first CV joint and the second CV joint respectively retained with the inboard elongate housing and the outboard elongate housing.

5. The drive shaft of claim 4, wherein the groove is circumferentially disposed at an outer-most edge of the interior of each of the inboard elongate housing and the outboard elongate housing.

6. The drive shaft of claim 1, wherein each groove is configured to receive a snap-ring, the grooves and snap-rings being configured to cooperatively retain the first CV joint and the second CV joint respectively retained with the inboard elongate housing and the outboard elongate housing.

7. The drive shaft of claim 1, wherein each of the inboard elongate housing and the outboard elongate housing comprises threads that are configured to rotatably engage with threads disposed within an interior of an end-cap, a lip of the end-cap comprising a narrow portion of the end-cap that prevents the first CV joint and the second CV joint from fully exiting respective interiors of the inboard elongate housing and the outboard elongate housing.

8. The drive shaft of claim 1, wherein the outboard plunging joint includes an outboard elongate housing configured to receive a second CV joint coupled to the drive shaft and to allow the second CV joint to move longitudinally within the outboard elongate housing, wherein the outboard elongate housing is configured to enable at least a portion of the second CV joint to be exposed to an exterior of the outboard elongate housing during longitudinal movement.

* * * * *